United States Patent [19]
Collette et al.

[11] Patent Number: 5,504,918
[45] Date of Patent: Apr. 2, 1996

[54] PARALLEL PROCESSOR SYSTEM

[75] Inventors: Thierry Collette, Les Ulis; Josef Kaiser, Courson-Monteloup; Renaud Schmit, Beville le Comte; Hassane Es-Safi, Orsay, all of France

[73] Assignee: Commissariat a l'Energie Atomique, France

[21] Appl. No.: 190,039

[22] PCT Filed: Jul. 30, 1992

[86] PCT No.: PCT/FR92/00751

§ 371 Date: Jan. 28, 1994

§ 102(e) Date: Jan. 28, 1994

[87] PCT Pub. No.: WO93/03441

PCT Pub. Date: Feb. 18, 1993

[30] Foreign Application Priority Data

Jul. 30, 1991 [FR] France ................... 91 09649

[51] Int. Cl.⁶ ............................................ G06F 15/80
[52] U.S. Cl. .................... 395/800; 364/229; 364/229.3; 364/229.1; 364/270.5; 364/DIG. 1
[58] Field of Search ................................................ 395/800

[56] References Cited

U.S. PATENT DOCUMENTS 5,208,900  5/1993  Gardner ........................ 395/27
5,218,709  6/1993  Fijany ............................. 395/800

FOREIGN PATENT DOCUMENTS 0194462  9/1986  European Pat. Off. ........ G06F 13/36
0201088  11/1986  European Pat. Off. ........ G06F 15/16
0367182  5/1990  European Pat. Off. ........ G06F 15/16

OTHER PUBLICATIONS

IBM Technical Disclosure Bulletin, vol. 26, No. 5, Oct. 1983, "Multiplex Interface Control . . . " J. R. Volk.

IBM Technical Disclosure Bulletin, Oct. 1983, "Multiplex Interface Control in a Closed–Ring Network", Volk, vol. 26 No. 5, pp. 2272–2275.

Primary Examiner—Eric Coleman
Attorney, Agent, or Firm—Hayes, Soloway, Hennessey, Grossman & Hage

[57] ABSTRACT

A multiprocessor system is disclosed wherein the processors communicate between each other asynchronously while carrying out synchronous processing. Each processor is associated with a cell connected to its neighbors by a ring network through which circulate messages for the processors. Each cell recognized the messages for its associated processor and communicates them to the associated processor. Particularly utility is found in the area of processing image-related data.

10 Claims, 3 Drawing Sheets

PARALLEL PROCESSOR SYSTEM

FIELD OF THE INVENTION

The present invention concerns a board multiprocessor system architecture of elementary processors organized according to a parallel structure.

This invention can be used in a large numbers of applications for processing data and more particularly data relating to image elements (or pixels).

BACKGROUND OF THE INVENTION

The processings of conventional images comprise several levels of processing. An expert in this field will normally consider three levels of processing:

- a low level which consists of a processing of the image derived from sensors so as to deduce from this a filtered image (this may be regarded as an "ionic processing" when this concerns the processing of images);
- a mid-level which consists of subsequently extracting the filtered image the useful symbols of the processing by transforming the data with an iconic format to a symbolic format (a processing also known as "symbolic processing").
- a high level which consists of processing these symbols and then transforming them so as to deduce from them the actions to be carried out. This level contains the intelligence of the processing of images as it contains in particular the shape recognition algorithms and the decision shots.

The low level is used in a large number of SIMD (Single Instruction Stream Multiple Data Stream) type multiprocessors systems, that is processors carrying out a given operation on different items of data.

On the other hand, the high level is used in MIMD (Multiple Instruction Stream Multiple Data Stream) type multiprocessors systems, that is complex structures allowing for parallelism both as regards the data and the instructions.

As for the mid-level, this is rarely parallelized. However, four approaches have been put forward shown on the accompanying FIGS. 1A, 1B, 1C and 1D.

Thus, on these same figures, four approaches of parallel architectures have been shown enabling the mid-level processing to be carried out.

FIG. 1A represents the "Bottom Up" architecture. In this architecture, the possibilities of the low level multiprocessor system BN are increased so as to support the operations of the mid-level MN. An independent multiprocessors system is able to process the operations of the high level HN.

FIG. 1B represents the "Top Down" architecture. In this architecture, the possibilities of the multiprocessors system carrying out the operations of the high level HN are modified so as to integrate with them the processings of images of the mid-level MN. An independent multiprocessor system is able to support the operations of the low level BN.

FIG. 1C has shown an architecture which could be known as a "unified architecture" in which a single system supports the three levels of processing, namely the high level processing HN, the mid-level processing MN and the low level processing BN, the multiprocessor being reconfigured during processing.

FIG. 1D has shown an architecture which could be known as "natural architecture" and which includes a specific mid-level MN processing system. In this architecture, each level has its own structure. It is therefore easy to move from a dimension structuring 2 (case of an image) to a symbolic structuring. However, this architecture proves to be extremely cumbersome as it requires three systems, each system being needed to support a different processing level.

The unified and Top Down architectures are difficult to implement: in fact, the low level and the mid-level can be integrated in SIMD mode systems but this mode is unsuitable for high level processings.

Thus, it seems preferable to select a Bottom Up architecture in which the low and mid-level can be implanted in a given SIMD mode system, the high level then being implanted in a second system working in the MIMD mode.

Architectures of Bottom Up type multiprocessor systems are already known, these systems mostly carrying out effectively the low level processing but are difficult to implement for mid-level processing.

Such a system has been described in the patent application published under the number FR-A-2 623 310. This concerns an image processing multiprocessor system known as SYMPATI. However, this system does not exhibit optimal performances, as shall be seen subsequently.

SYMPATI is a distributed memory multiprocessor system comprising a large number of processors. These processors are organized into a line and have an arithmetic and logic unit (ALU) with a precision of 16 bits. The image is distributed helically on the processors which have a specific address calculation module. A synchronous interconnection system makes it possible to make short distance exchanges between elementary processors. In addition, each processor is free to calculate its own memory address; the system thus has two types of synchronous and asynchronous addressing. The performances of SYMPATI are good for low level processings but limited for mid-level image processing operations. In fact, for this type of processing, it is necessary to invite input from a host processor so as to carry out a redistribution of the data with the aim of maintaining a certain parallelism. In effect, the passage from a low level to a mid-level poses a problem: the number of items of data required for analysis of an image (mid-level processing) is less than the initial number of elements (pixels) of this image and requires that the latter be redistributed.

Another drawback of the current SYMPATI structure concerns long distance access between elementary processors: this access requires a considerable processing time. In addition, the implementation of random transfers is complex as regards SYMPATI.

SUMMARY OF THE INVENTION

The present invention is able to resolve these drawbacks by proposing an interconnection system able to be adapted on SIMD multiprocessor systems, one example of the latter being SYMPATI. This interconnection system, also known as a communication network, is able to make all types of exchanges between the various processors of the system, namely: the intercommunication of each processor to any other processor, the communication of one processor to all the other processors, and the communication of all the processors to a single processor. Thus, it allows for a distribution of data making it possible to effectively manage the available resources, namely the elementary processors. These processors are organized according to a board structure in which the processors are disposed into generally rectangular networks. Each processor may be associated with one pixel of an image or a group of pixels and it has access to the neighbouring pixels by means of the interconnection links mentioned earlier. The processors are organized according to a parallel structure, that is all the processors required to carry out a processing carry out the same processing at the same time.

More specifically, the present invention concerns a system of elementary processors board organized according to a parallel structure and including memories connected respectively to the elementary processors and means for interconnecting said processors, wherein the processor interconnection means include cells each allocated and connected to one processor and connected to the cells of the neighbouring processors in the board, the cell of the last processor of the board being connected to the cell of the first processor of the board so that the cells, once connected, form a ring network in which the messages, emitted by at least one processor, circulate, these messages being intended for at least one other processor.

Advantageously, the processors are organized so as to carry out processing synchronously and the network of cells in organized in such a way as to allow for asynchronous accesses to said processors.

According to the invention, the system includes a central control processing unit able to order the inputting or outputting of data in the ring network and to shift this data along said ring. It may be connected to the ring network by means of a cell similar to the cells allocated to the processors.

In addition, each cell includes means to recognise the messages which are addressed to the processor to which it is associated. It further includes means to store the information contained in the messages received or to be emitted and means to manage a dialogue with the neighboring cells and the control processing unit. The storage means are connected to the recognition means, the latter being connected to the ring network. In addition, the management means are connected to the network, the storage means and the recognition means.

According to one characteristic of the invention, the means for recognizing the messages are able to be inhibited when a processor sends a generalized message to all the other processors.

Advantageously, the cells of the ring network are connected to identical cells of a second ring network in which the messages circulate in a direction opposite the circulation direction of the messages in the first network.

In order to obtain improved processing of the data of the image, the system may include specialized modules, such as a floating arithmetic processing unit (FPU), connected by means of a cell to the ring network.

The system may in addition include an overall memory connected by means of a cell to the ring network. The system also includes at least one interface connected to the cell of the overall memory to a cell of the ring network.

BRIEF DESCRIPTION OF THE DRAWINGS

Other advantages and characteristics of the invention shall appear more readily from a reading of the following nonrestrictive description given by way of illustration with reference to the accompany drawings on which.

DETAILED DESCRIPTION OF THE PREFERRED EMBODIMENTS

Figure 1A:
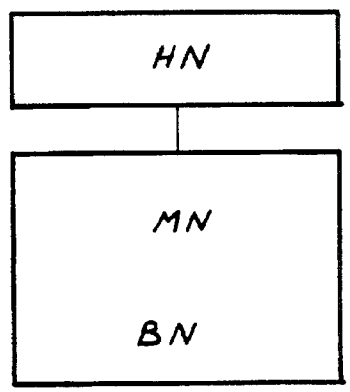
FIGS. 1A, 1B, 1C and 1D, already described, represent four parallel architecture approaches for mid-level processing.
Figure 1B:
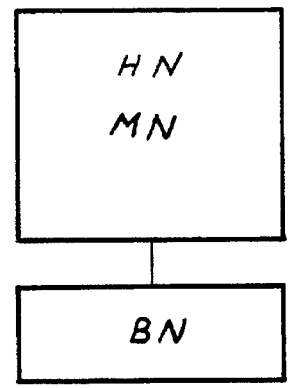
Figure 1C:
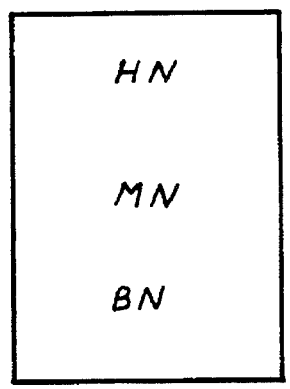
Figure 1D:
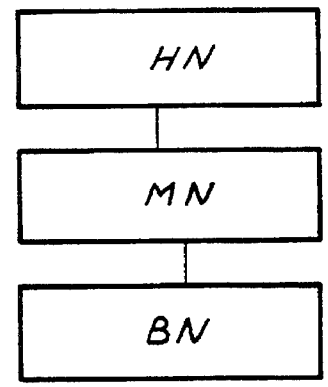
Figure 2:
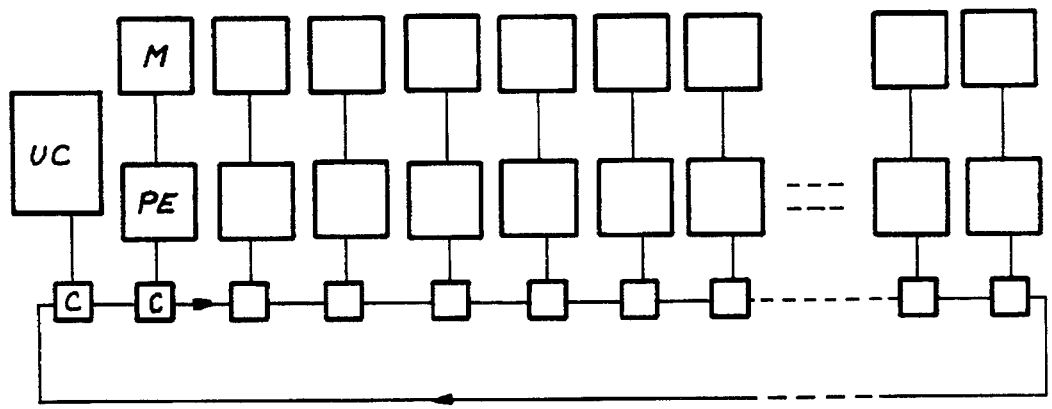
FIG. 2 shows the block diagram of the interconnection system of the invention.

FIG. 2 shows the block diagram of the interconnection system, also known as an intelligent or ring network. This interconnection system includes stations interconnected in such a way as to form a loop, hence the name of a ring network application. Each station of this network is able to emit or receive a signal. The receiving of this signal is effected by acknowledging a message circulating in the ring.

The word "station" is understood to be constituted by a cell (also known as a node), an elementary processor and a memory. Thus, the ring network is constituted by a set of cells C connected respectively to an,elementary processor PE, itself connected to a memory M. An exchange of information may thus be established directly between a memory M and its associated processor PE, and between a processor PE and its associated cell C. Each cell C is further connected by its outlet to the inlet of the next cell in the network. Thus, each processor PE is able to exchange information with another processor by means of their cells.

In fact, in the multiprocessor system of the invention, the memory is a distributed type memory, that is each processor PE may be in relation with a memory M connected to another processor of the system. The ring interconnection mode of the invention is able to effect this exchange between each of the processors and the associated memory to each of the other processors of the network. This dialogue between processors is established and managed by the cells associated with each of said processors. Thus, the processors wanting to send a message write said message which is sent into the network by means of their associated cell.

This message, like all the messages sent into the ring by any processor, is made up of three fields;

a data field to be transmitted, an address field comprising the number of the processor for which the message is intended and its local address, and a control field.

The message sent by a processor PE circulates in the ring and, as soon as the processor for which it is intended receives said message, this processor recovers the data and indicates in the control field that said item of data has correctly been received. Each message is thus circulated independently, that is the messages are distributed asynchronously.

Also connected to this network is a central control processing unit. This control unit (UC) is connected to a cell C identical to the cells of the processors and is thus able to use the network for its exchanges of information. This central control unit is able in particular to manage the circulation of the messages in the network. Thus, when the ring is empty, the authorization of a new write, that is a new sending of a message, is given by said control processing unit.

While the cells and the central control unit respectively manage the receiving and circulation of the messages in the network, the processors have the possibility and capacity to carry out other processings, such as low level processings.

Thus, the "intelligent" network operates according to an asychronous consecutive mode in which a message goes round the ring in several machine cycles of the processor (about 8 machine cycles according to the described embodiment of the invention).

Figure 3:
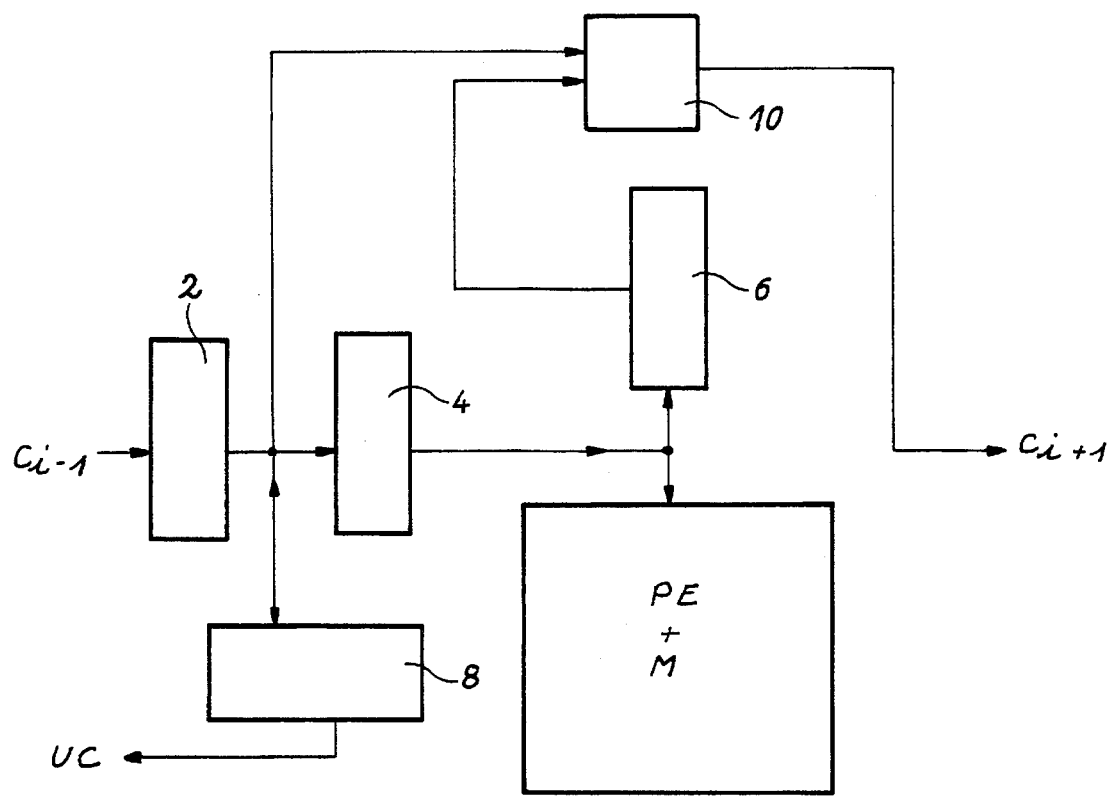
FIG. 3 presents a cell.

FIG. 3 diagrammatically shows a cell C. This cell includes a message recognition module 2, buffers 4 and 6, a control logic 8 and an interface 10.

The buffers 4 and 6 may, according to the embodiments, be registers, memories or FIFO (First In, First Out) stand-by lists. In the embodiment described, these buffers 4 and 6 are registers which, associated with the registers of the other cells, form a register with parallel shift and relooped in which the messages circulate extremely quickly. The buffer 6 stores a complete message, whereas the buffer 4 stores a message without the processor number which is inscribed there.

The cell shown on FIG. 3 is regarded as the cell Ci of the processor of the network. The messages received by this cell Ci arrive from the cell Ci−1. Each message enters into the cell Ci via the message recognition module 2 able to determine if said message is addressed or not addressed to its associated processor PEi. This message recognition module 2 compares the number of the processor associated with it with the processor number present in the address field of the message received. If there is a coincidence, the data and address are stored in the buffer 4 and the processor signals that it has read the message by setting, for example, a DL bit (data read) contained in the control field of the message. As long as the message has not been read, that is as long as the central unit has not detected the DL bit, the network is activity-supported.

Thus, if the message received is not recognized by the recognition module 2 of the cell Ci, it is then directed to an interface 10 input-connected to the recognition module 2 and the control logic 8 and is then sent to the recognition module 2 of the cell Ci+1. On the other hand, when the message is recognized by the message recognition module 2, the data contained in said message is sent to the register 4 input-connected to said module 2 and the control logic 8. At the same time, a signal is sent into the control field of the message received by said control logic 8, this signal informing the central processing unit UC that the message circulating in the ring has been correctly received by the processor for which it was intended. The processor is then able to read the data addressed to it and subsequently store it in the memory Mi directly connected to it. After reading of the data contained in the message (DL bit detected), another message is placed in circulation in the ring.

In the same way, when the processor PEi decides to send a message, it writes this message in the register 6 input/output-connected to said processor and output-connected to the interface 10 which ensures the sending of the message to the recognition module 2 of the neighboring cell Ci+1. In the SIMD mode, this writing operation is effected simultaneously by all the processors wishing to send a message; in other words, these processors work in parallel.

According to one embodiment of the invention, the message recognition module 2 is able to be inhibited (rendered transparent) when a processor sends an overall message, that is an item of data intended for all the other processors of the network. When the message recognition modules 2 of the non-emitting processors thus become transparent, the data is then available in each node of the network, that is in each cell of the network.

In a more functional way, the rôle of each cell is primordial for the sound functioning of the interconnection system and consists of:

determining if a message is addressed to its associated processor;

controlling the reading and writing operations of the data in the memory of its associated processor;

storing the messages to be emitted or received;

being inhibited when a processor, different from its associated processor, has sent information to all the other processors, including its associated processor;

managing the dialogue with its neighbouring cells and with the central control processing unit.

In addition, the rôle of the central control unit is to manage any conflicts appearing at the time of simultaneous accesses to a memory, take into account the signals sent by the buffers 4 and 6 (for example, full buffers, etc) so as to intervene concerning the running of the current program, and, should any problem occur, generate an error message. In addition, the control unit is able to integrate functions able to carry out much faster the inputs/outputs of images by using the network as the registers are not integrated in the elementary processors, which permits increased operating speed.

Figure 4:
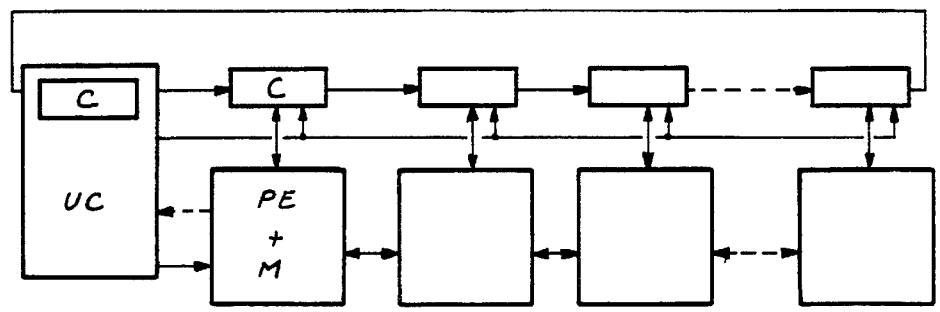
FIG. 4 represents the interconnection system of the invention, this figure showing the links between the cells, the processors, the memories and the control processing unit connected by means of said interconnection system.

FIG. 4 shows, according to one embodiment of the invention, the multiprocesor system comprising the central processing unit, the processors and the network as shown on FIG. 2. This figure also shows the relations between each element of the multiprocessor system. As described on FIG. 2, it can be seen that the cells are interconnected to one cell of the network, this cell according to certain embodiments of the invention being able to be integrated in the central processing unit.

This central unit is also connected to each cell so as to send to each of said cells a clock signal. In addition, said central unit receives from each of said cells the control bits sent by the cell control logic. The clock signals and these control bits are able to circulate on a given physical link. In addition, the central processing unit is connected to its neighboring processor in the ring, this processor, like all the others, being connected to its neighbors.

According to one embodiment of the invention, the first processor of the network may have a double link with the control processing unit (the central unit sends signals to the processor and the processor sends signals to the control unit) so as to download to said control unit any information bits originating from said processor.

Figure 5:
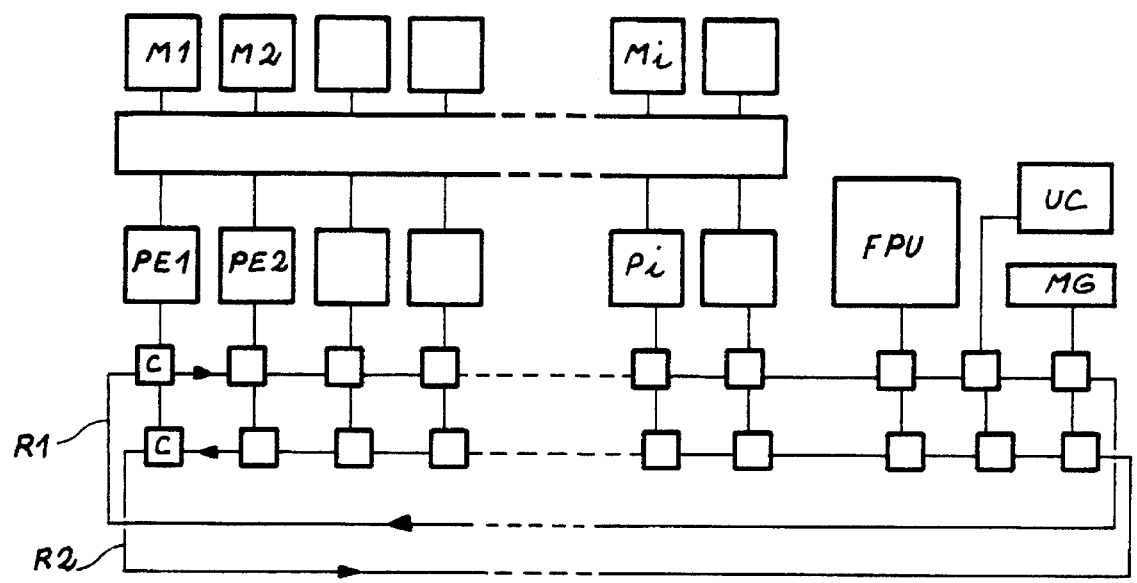
FIG. 5 represents the diagram of an interconnection system according to a more high performing embodiment of the invention.

FIG. 5 shows a diagram of the intelligent network corresponding to another embodiment of the invention. This other embodiment is able to optimize the exchanges between the processors.

Indeed, in this embodiment of the invention, the interconnection system comprises two ring networks R1 and R2, the information circulating in opposing directions in each of the two networks. In the first network R1, the messages circulate in the direction of the increasing processor numbers and in the second network R2 the messages circulate in a direction opposite the direction of the first network R1. For a number of processors in excess of 32, it is advantageous to use two networks with opposing exchange directions. For example, if the processor PE1 wishes to conduct dialogue with the processor EP1 (i=250, for example), it is much more advantageous, that is much faster, to exchange messages through the second network in which the messages circulate in a negative direction with respect to the increasing direction of the number of the processors. On the other hand, if the processor PE1 wants to send a message to the processor PE2, the circulation time of the message in the first network is much less than it would be in the second ring network.

The choice of the network to be used for transmitting messages is effected by observing the address of the processor for which the message is intended. Of course, the network allowing for the shortest path in the ring is selected.

The second ring network R2 is identical to the first network R1, that is it comprises as many cells as the first network, each cell being firstly connected to its neighboring cells, and secondly connected to the corresponding cell of the first network. FIG. 5 also shows particular modules, such as the floating arithmetic processing unit (FPU) and the overall memory OM, these modules being able to offer additional power and flexibility to the multiprocessor system.

In fact, the FPU may be integrated in the system by means of a cell connected to the network and, by virtue of its presence, offers increased processing power.

The overall memory MG is, as its name indicates, a memory common to all the processors of the network, each processor being able to gain access to said memory directly via the network.

Apart from the FPU, amongst the particular calculation modules able to be used in the invention, this may be a divider module able to carry out the ratio between the contents of two registers, or a chain list processing processor.

Generally speaking, the intercommunication system between processors of the invention can be used on most SIMD type systems and allows for an effective mid-level processing by virtue of maintaining parallelism, especially during data distribution phases.

We claim:

1. A parallel processor array system, and comprising, a plurality of elementary processors including a first and a final processor, said plurality of processors being configured into a parallel architecture, and a plurality of memories each of said memories for being associated with and connected to a respective one of said plurality of processors and to means for interconnecting said plurality of processors, each of said plurality of processors being adapted to perform synchronous data exchange between itself and neighboring processors for facilitating low level processing by said processors of data, wherein each of said processors includes an asynchronous addressing module and said parallel processor array system includes a plurality of cells, each of said cells being associated with and connected to a given processor and also being connected to cells associated with and connected to neighboring processors, the cell associated with and connected to said first processor being connected to the cell associated with and connected to said final processor, said cells thus connected forming a ring network for permitting circulation of messages involving asynchronous exchange of data between at least one of said plurality of processors and at least one other of said plurality of processors for permitting said plurality of processors to perform mid-level symbolic processing of said data.

2. A system according to claim 1, wherein the ring network is connected to a central control unit for managing circulation of the messages in the ring and their insertion into and extraction from said ring.

3. A system according to claim 2, wherein said central control unit is connected to the ring network by a cell.

4. A system according to claim 3, wherein each cell includes recognition means (2) connected to the ring network for recognizing messages addressed to the elementary processor to which it is connected, storage means (4, 6) connected to the recognition means for storing the data contained in the messages, and management means (8, 10) connected to the network and the storage and recognition means for managing a dialogue with neighboring cells and the control unit.

5. A system according to claim 4, wherein the recognition means is also for being inhibited when an elementary processor sends a generalized message to all the other processors.

6. A system according to claim 2, wherein the cells of the network are respectively connected to identical cells of a second network in which messages circulate in a direction opposite the circulation direction of the in the first network.

7. A system according to claim 1, and further comprising a calculation module connected to a cell connected to the ring network.

8. A system according to claim 7, wherein said calculation module is a floating arithmetic processing unit.

9. A system according to claim 1, and further comprising an overall memory connected to a cell connected to the ring network.

10. A method for using a system according to claim 1, for processing images in which the elementary processors are used to carry out said low level and symbolic processings.

* * * * *